United States Patent
Kusmierczyk et al.

(10) Patent No.: US 6,502,294 B2
(45) Date of Patent: Jan. 7, 2003

(54) TRANSFER LINE WORKPIECE INSPECTION APPARATUS AND METHOD

(75) Inventors: Richard A. Kusmierczyk, Windsor (CA); Dale A. Ritthaler, Fraser, MI (US)

(73) Assignee: Unova IP Corp., Woodland Hills, CA (US)

( * ) Notice: Subject to any disclaimer, the term of this patent is extended or adjusted under 35 U.S.C. 154(b) by 0 days.

(21) Appl. No.: 09/877,766

(22) Filed: Jun. 8, 2001

(65) Prior Publication Data

US 2002/0184746 A1 Dec. 12, 2002

(51) Int. Cl.[7] .......................... B23Q 41/08; G06F 15/00
(52) U.S. Cl. ........................ 29/430; 29/33 P; 29/564; 409/131; 700/109; 700/110
(58) Field of Search ..................... 29/563, 564, 33 P, 29/33 T, 430; 198/464.4; 409/131; 235/375; 700/104, 109, 110, 113

(56) References Cited

U.S. PATENT DOCUMENTS

| | | | |
|---|---|---|---|
| 3,684,088 A | * 8/1972 | Buttke et al. | 209/3.1 |
| 3,845,286 A | 10/1974 | Aronstein et al. | |
| 4,309,600 A | * 1/1982 | Perry et al. | 235/375 |
| 4,385,685 A | 5/1983 | Sticht | |
| 4,442,577 A | * 4/1984 | Numano et al. | 29/33 T |
| 4,472,783 A | 9/1984 | Johnstone et al. | |
| 4,564,913 A | 1/1986 | Yomogida et al. | |
| 4,831,540 A | * 5/1989 | Hesser | 700/113 |
| 4,901,242 A | 2/1990 | Kotan | |
| 5,077,674 A | * 12/1991 | Tischler et al. | 29/33 P |
| 5,239,739 A | * 8/1993 | Akeel et al. | 29/430 |
| 5,353,230 A | * 10/1994 | Maejima et al. | 235/375 |
| 5,355,579 A | * 10/1994 | Miyasaka et al. | 198/464.4 |
| 5,793,633 A | * 8/1998 | Noguchi et al. | 700/104 |
| 5,873,392 A | 2/1999 | Meyer et al. | |
| 5,896,294 A | 4/1999 | Chow et al. | |
| 5,898,588 A | 4/1999 | Morimoto | |
| 6,182,049 B1 | * 1/2001 | Barker et al. | 700/109 |
| 6,202,037 B1 | * 3/2001 | Hattori et al. | 700/109 |
| 6,301,515 B1 | * 10/2001 | Wagner | 700/109 |
| 6,314,379 B1 | * 11/2001 | Hu et al. | 700/110 |

FOREIGN PATENT DOCUMENTS

JP    6-72546    * 3/1994 .................. 29/564

* cited by examiner

Primary Examiner—William Briggs
(74) Attorney, Agent, or Firm—Reising, Ethington, Barnes, Kisselle, Learman & McCulloch, P.C.

(57) ABSTRACT

A transfer line apparatus for performing multiple machining operations on each of a plurality of workpieces in a transfer line. The apparatus includes a plurality of different kinds of machining units disposed at respective machining stations along a transfer path. A workpiece transporter moves workpieces along the transfer path to position each of the workpieces at each of the machining stations and allow each of the machining units to machine each of the workpieces as the workpieces move along the transfer path. A controller connected to the machining units responds to an inspection command by causing all machining units downstream from a designated machining unit along the transfer path to allow a workpiece selected for inspection to pass by without being machined by the downstream units. This allows the workpiece to be inspected in a form that the remaining machining units have not altered.

12 Claims, 3 Drawing Sheets

TRANSFER LINE WORKPIECE INSPECTION APPARATUS AND METHOD

TECHNICAL FIELD

This invention relates generally to a method and apparatus for inspecting workpieces in a transfer line.

BACKGROUND OF THE INVENTION

A typical transfer line for fabricating metal parts in a machining or assembly line process generally includes a number of different kinds of single-purpose or multipurpose machining units arranged at respective machining stations along a transfer path. A transfer mechanism transfers workpieces along the transfer path and positions each of the workpieces at each machining station. This allows each of the machining units to machine each of the workpieces as the workpieces move along the transfer path to an exit end of the transfer line.

For example, U.S. Pat. No. 5,197,172 issued 30 Mar. 1993 to Takagi et al., discloses a metal fabricating transfer line that includes a plurality of different kinds of single-purpose machining units arranged at plural machining stations located along a transfer path. The transfer mechanism of the Takagi et al. system includes a return conveyor or transfer vehicle that transfers workpieces from an exit end of the transfer path, along a return path, to a workpiece unloading station. Takagi et al. also discloses a numerically controlled general-purpose machine tool that is disposed adjacent the return path. The general-purpose machine tool carries out special machinings on certain predetermined ones of the workpieces that the single-purpose machining units are unable to accomplish. However, a metal fabricating transfer line constructed according to the Takagi et al. patent includes no provision for inspecting workpieces.

As another example, the prior art metal fabricating transfer line and inspection apparatus shown schematically at 10 in FIG. 1 of the drawings includes eight stations 12A–12H. At stations 12A through 12D and 12F through 12H, various machining units 14A–14D and 14F–14H perform operations on workpieces that pass through the eight stations 12A–12H along a transfer path 16. For example, machining unit 14A and station 12A could be a machine for milling the top of the workpiece, machining unit 14B at station 12B could be a machine for milling the sides of the workpiece, machining unit 14C at station 12C could be a boring machine, machining unit 14D at station 12D could be a tapping machine, and machining unit 14F at station 12F could be a counter-boring machine, etc.

Station 12E is a workpiece inspection removal station disposed between machining units 14D and 14F along the transfer path 16. The inspection removal station 12E is disposed in this position to allow an operator to remove a workpiece from the transfer path 16 after the machining operations at preceding stations 12A–12D have been completed but before the machining operations at succeeding stations 12F–12H have been completed. The workpiece inspection removal station 12E is designed to allow an operator to gain access to the transfer path 16 and select, remove and inspect any number of workpieces and at any frequency. The presence of the removal station 12E allows an operator to remove, for example, every fifth workpiece 13 that comes down the transfer path 16, one workpiece 13 per hour, or one workpiece 13 a day. The transfer line and inspection apparatus 10 of FIG. 1 also includes a workpiece inspection area 18 remote from the workpiece inspection removal station 12E where an operator takes workpieces for inspection after having retrieved the workpieces from the transfer path 16 at the removal station 12E. However, a workpiece inspection apparatus constructed according to the prior art transfer line system of FIG. 1 will not allow an operator to remove a workpiece 13 for inspection from any other intermediate machining stage along the transfer path 16. Nor will it allow an operator to remove a workpiece 13 without interrupting workpiece flow along the transfer path 16, or without physically removing the workpiece 13 from the transfer path 16 at that stage. The system of FIG. 1 also requires that a removal station be built into the transfer line to allow such access.

SUMMARY OF THE INVENTION

The invention is a transfer line apparatus for performing multiple machining operations on a series of workpieces. The apparatus includes a plurality of different kinds of machining units disposed at respective machining stations disposed along a transfer path. A workpiece transporter is configured to move workpieces along the transfer path so as to position each of the workpieces at each of the machining stations. This allows each of the machining units to machine each of the workpieces as the workpieces move along the transfer path.

Unlike the prior art of record, at least one of the machining units is configured to respond to an inspection command by allowing a designated workpiece to pass by the designated machining unit along the transfer path without being machined by the designated machining unit. This allows the workpiece to be inspected in a form unaltered by the designated machining unit.

The invention also includes a method for inspecting workpieces in a transfer line. According to this method one can inspect workpieces in a transfer line by first providing a plurality of different kinds of machining units at respective machining stations disposed along a transfer path. The workpieces are moved along the transfer path so that the workpieces can be machined at each of the machining stations by the corresponding machining units. A workpiece to be inspected is then selected as well as a desired machined state that the selected workpiece is to be in for inspection. The point along the transfer path at which the selected workpiece will be in the desired machined state is then determined. Any remaining succeeding machining units are then prevented from further machining the selected workpiece as the selected workpiece moves long the transfer path to an exit end of the transfer path. The workpiece is then inspected in the desired machined state.

Objects, features and advantages of this invention include the ability to inspect workpieces in the condition the workpieces were in as they left any one of a number of machining units along a transfer path in a transfer line and without having been further machined or otherwise altered by subsequent machining units along the transfer path; the ability to inspect a workpiece in an intermediate machining stage along the transfer path without interrupting workpiece flow along the transfer path, without physically removing the workpiece from the transfer path at that stage and without having to provide a removal station to allow such access; reducing risk to operators by obviating the need to physically enter the transfer line between working machining units to retrieve parts for inspection; requiring fewer stations in any given transfer line by eliminating the need for a separate inspection and removal station; and to allow transfer lines to be accommodated in smaller facilities by allowing the transfer lines to be shorter in length.

BRIEF DESCRIPTION OF THE DRAWINGS

These and other objects, features and advantages of this invention will be apparent from the following detailed description of the preferred embodiment and best mode, appended claims, and accompanying drawings in which:

DETAILED DESCRIPTION

Figure 1:
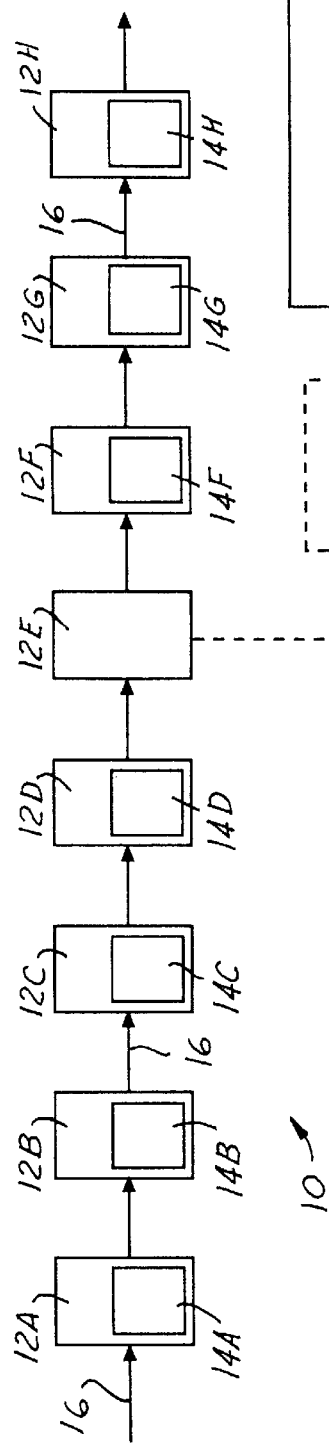
FIG. 1 is a schematic view of a prior art transfer line.
Figure 2:
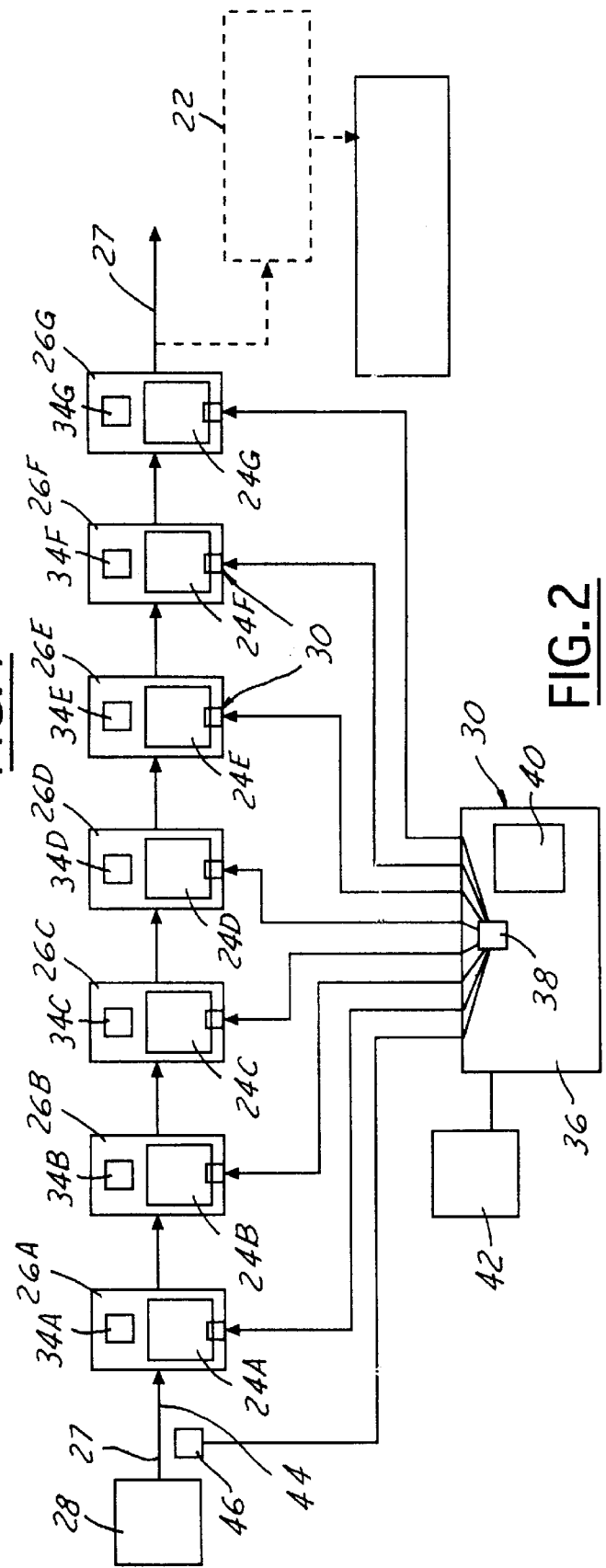
FIG. 2 is a schematic view of a transfer line constructed according to the present invention.
Figure 3:
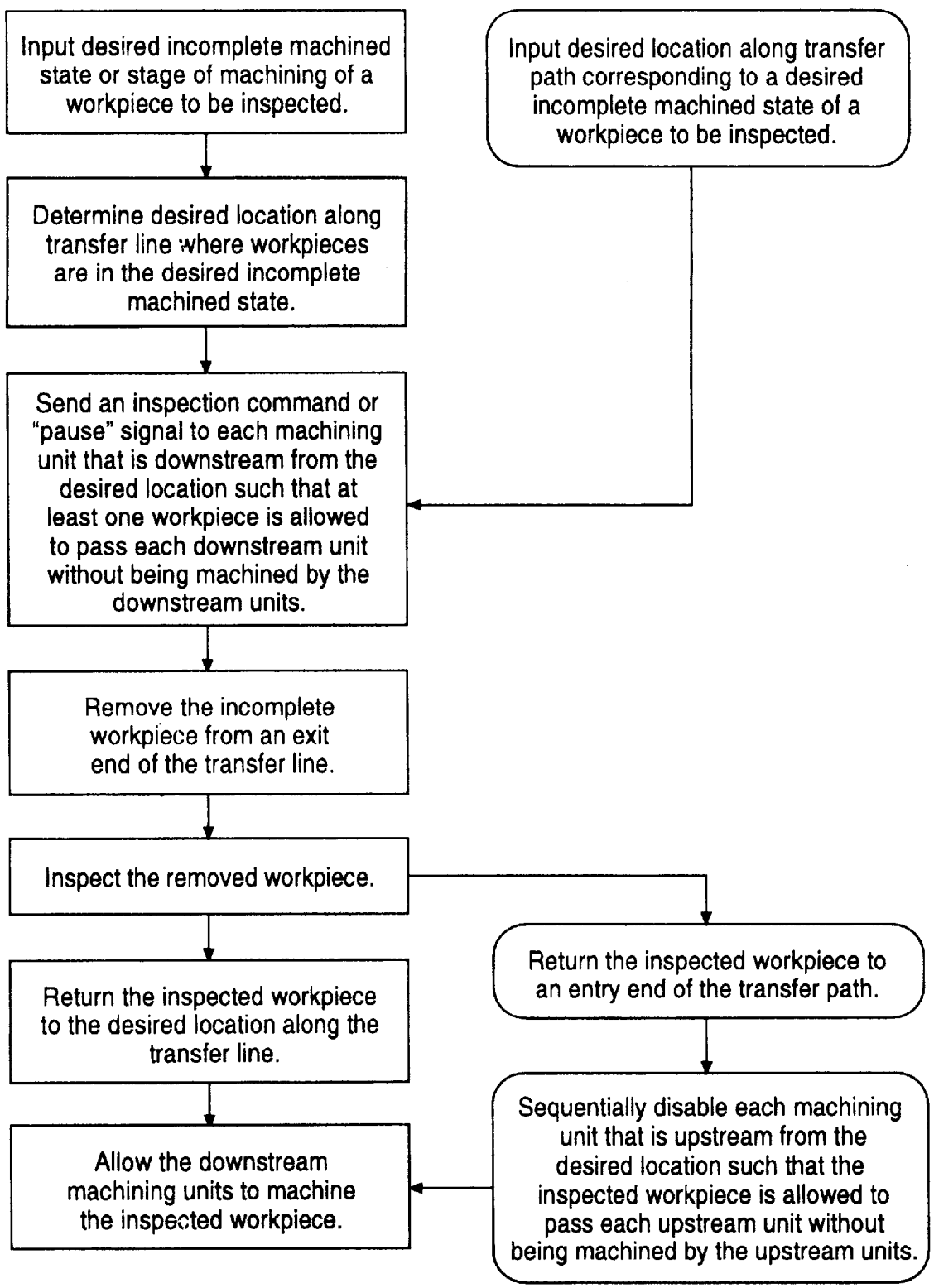
FIG. 3 is a flow chart showing a method of inspecting workpieces in a transfer line.
Figure 4:
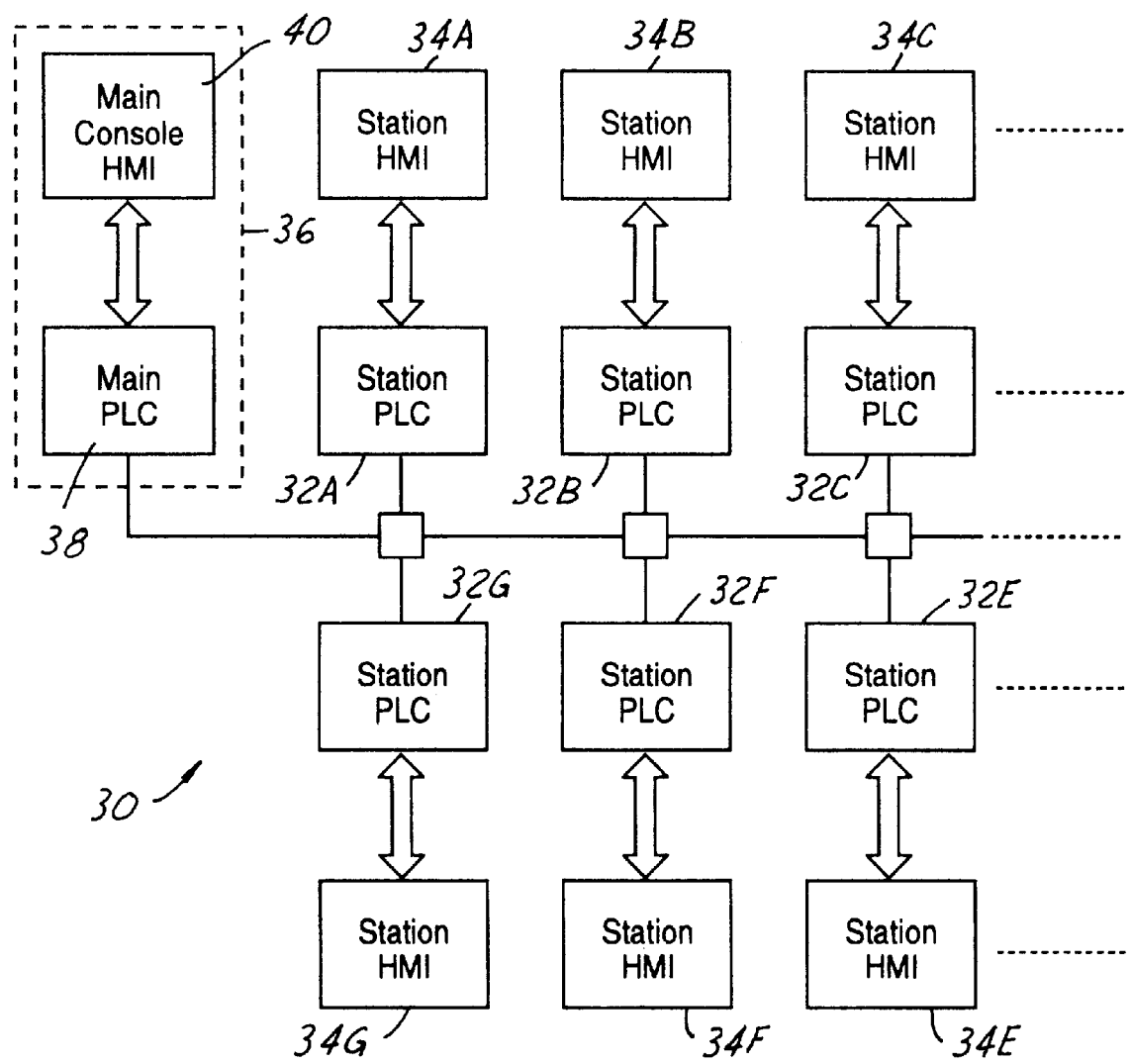
FIG. 4 is a schematic block diagram showing communications links between PLCs and HMIs of the transfer line of FIG. 2.

A transfer line apparatus 20 for performing multiple machining operations on a series of workpieces 22 is shown in the drawings. The apparatus 20 includes seven machining units 24A–24G disposed at respective machining stations 26A–26G along a transfer path 27. (In other embodiments, the apparatus 20 may include more than seven or less than seven machining units and machining stations.) The apparatus 20 also includes a workpiece transporter 28 that moves workpieces 22 along the transfer path 27 so as to sequentially position each of the workpieces 22 at each of the machining stations 26A–26G to allow each of the machining units 24A–24G to machine each of the workpieces 22 as the workpieces 22 move along a transfer path 27. The apparatus 20 includes a controller 30 connected to the machining units 24A–24G and configured to respond to an inspection command by causing all machining units downstream from a designated machining unit along the transfer path 27 to allow a workpiece 22 selected for inspection to pass by without being machined by the downstream units. This allows a selected workpiece 22 to bypass the downstream machining units so that it can be inspected in a form unaltered by those units.

The controller 30 includes Omron C200HE-CPU42E programmable logic controllers disposed at each machining station (station PLCs 32A–32G) and connected to respective Omron NT31C-ST141B 5.7" color, touch screen, PC based HMI control panels (station HMI control panels 34A–34G) and to the respective machining units 24A–24G located at each machining station 26A–26G. The station PLCs 32A–32G are configured to send control signals to their respective machining units 24A–24G and to receive operator inputs through their respective station HMI control panels 34A–34G and may receive part position information through part sensors. The station PLCs 32A–32G also display information on workpiece location in the form of light and message displays on their respective station HMI control panels 34A–34G. For example, the station HMI control panels 34A–34G display screens show the location of each workpiece 22 selected for inspection as each such workpiece 22 progresses through the machining stations 26A–26G along the transfer line. In other embodiments any suitable set of HMIs and any suitable set of PLCs may be used. Other embodiments may alternatively use PC-based control rather than PLC-based control at each station 26A–26G. In other embodiments information on workpiece location may be repeated on one or more larger visual displays such as marquees.

The apparatus 20 includes a main console 36 that serves as a focal point of an apparatus 20 command and control center. Operation of the apparatus 20 is started from the main console 36. An operator goes to the main console 36 to select what type of cycle the apparatus 20 will execute, i.e. continuous, single, or runout (runout being a final cycle used to purge the apparatus 20 of workpieces 22). If the apparatus 20 is a type capable of running different parts, the main console 36 can also be used to indicate to the controller 30 the type of parts to be processed.

The controller 30 includes a single Omron C200HG-CPU43E programmable controller (main console PLC 38) that is connected to an Omron NT631C-ST1513 9.7" color, touch screen, intelligent HMI (main console HMI 40) at the main console 36. (In other embodiments the main console HMI may be PC-based). The main console PLC 38 is connected to each of the station PLCs 32A–32G which act as slaves to the main console PLC 38. The main console PLC 38 displays output information and input graphics on the main console HMI 40). The machine main console PLC 38 processes all safety-related commands and apparatus utility functions such as hydraulic, pneumatic and coolant system control functions for the entire apparatus 20. The main console PLC 38 is a "hub" for the information gathering from all station PLCs 32A–32G, and acts as the machine cycle "command center" by processing the gathered data and sending commands to the "slave" station PLCs 32A–32G. The main console PLC 38 is also a "window" to the outside world for the apparatus 20 as it communicates the status of the apparatus 20 to the outside world through the HMIs and receives signals from part sensors and associated equipment up and downstream of the technological process. The main console PLC 38 can also be configured to communicate machine status data to an upper level management system strictly according to any defined system protocol that might exist in a user's plant.

The controller 30 is programmed to respond to an inspection command received from an operator at any one of the station HMIs 34A–34G or the main console HMI 40 by preventing certain of the machining units 24A–24G from machining the selected workpiece 22 as the selected workpiece 22 passes by. The station PLCs 32A–32G are programmed to respond to commands from the main console PLC 38 by causing their respective associated machining units 24A–24G to cease operating only long enough to allow the selected workpiece 22 to pass by without machining that workpiece 22. Each machining unit will pause long enough to allow that workpiece 22 to pass by, then will resume machining on the following workpiece 22 and will continue machining additional following workpieces 22 until receiving another inspection command. This allows the selected workpiece 22 to travel the length of the transfer path 27 without any additional machining operations being performed on it. As such, the workpiece 22 can be inspected in the form it was in before being machined by the designated machining unit or any of the subsequent machining units following the designated machining unit along the transfer path 27.

The apparatus 20 may also include a part tracking system that includes a tracker 42 that is connected to the main console PLC 38 and that monitors the position of selected workpieces 22 as they move along the transfer path 27. The apparatus 20 is of a "straight synchronized transfer" style, which means that its workpiece transporter 28 indexes all workpieces 22 forward by one "transfer" at a time. (In other embodiments, an accumulative/deaccumulative" program may be provided for some machining stations that have longer technological cycle times than the other machining stations. Such a program allows a workpiece 22 to be indexed in and out of a machining station every other transfer rather than at each transfer.) At an entry point 44 of the apparatus 20 there is a "part present" sensor 46. Information from the "part present" sensor is loaded into the main console PLC 38 and is then "shifted forward" with each machine transfer in -the same way that "selected workpiece" information is being carried. Each time the apparatus workpiece transporter 28 advances or transfers, a station fixture mechanism "overtravel" sensor checks for the "absence" of a workpiece 22. The station PLC compares this information with part tracking information from the main console PLC 38. Additionally, before transfer, the PLC compares the detected part status from the previous station. If the main console PLC 38 indicates that there should be a workpiece 22 transferred into the station, the previous station confirms that a workpiece 22 was present before the transfer. If the gaining station does not detect that a workpiece 22 is absent, then the station "knows" that a workpiece 22 is present. The part tracking system also provides signals to the station PLC indicating various information concerning the workpiece 22, e.g., the type of workpiece 22 and whether the workpiece 22 has been selected for inspection or is known to be defective.

In other embodiments, the tracker may include a marking device that marks a selected workpiece 22. This allows a human operator to locate and remove the workpiece 22 for inspection or, alternatively, to allow an optical reader to locate and signal a robot or other suitable mechanism to remove the workpiece 22 for inspection.

In practice, an operator can inspect a workpiece 22 in a transfer line in an intermediate stage of completion by first determining which workpiece 22 is to be inspected, the desired intermediate machined state that the selected workpiece 22 is to be in for inspection and the (designated) machining station at an intermediate position along the transfer line in which the selected workpiece 22 will be in the desired intermediate machined state. The operator then enters an inspection command on the station HMI at the designated station from which the part will be taken for inspection. Specifically, the operator touches a "Stop at the end of cycle" button on the designated station HMI. The machine will finish its machining cycle on the selected workpiece 22 before stopping in response to this input. The operator then selects on the designated station HMI an "inspection part request" screen. On this screen, the operator enters a password, touches a "part inspection" button and acknowledges the request. The station HMI then sends a corresponding signal to the designated station PLC which transfers the information to the main console PLC 38 for apparatus diagnostic purposes, and for part tracking. After selecting the art inspection sequence, the operator touches a "Restart Auto cycle" button on the designated station HMI. The controller 30 is programmed to respond by commanding the workpiece transporter 28 to cycle the selected workpiece 22 from the designated station and to command the downstream machining units to exclude the selected workpiece 22 from further processing. An HMI "part tracking" screen will show the progress of the selected workpiece 22 as the selected workpiece 22 is advanced along the transfer path 27. The selected workpiece 22 continues along the transfer path 27 to an unload station at the exit end of the transfer path 27 where its progress is halted when the controller 30 stops the workpiece transporter 28. A display screen at the unload station indicates to the operator when the workpiece 22 at the unload station is the one to be inspected. The operator then manually removes the selected workpiece 22 from the unload station for inspection and makes an HMI entry that acknowledges workpiece removal and sends a reset signal to the controller 30. The operator may then restart the workpiece transporter 28 and return the system to automatic operation by making an HMI entry requesting an "auto restart".

Alternatively, part inspection may be directed from the main console 36. To do this, an operator selects a special workpiece inspection removal sequence option on the main console HMI 40. The operator may, for example, program the controller 30 to exclude every Xth part from being machined following a designated machining station. The controller 30 will then cause the workpiece transporter 28 and machining units 24A–24G to execute the request without stopping. Main HMI screen operation is the same as for station HMIs. However, when the operator selects the inspection sequence on the main HMI screen, the main HMI screen sends a corresponding signal directly to the main console PLC 38. Therefore, the main console PLC 38 gets the information for the diagnostics and part tracking from the main console HMI 40, then communicates "exclude part from processing" commands to each station, in sequence, through the station PLCs 32A–32G when the workpiece transporter 28 is about to transfer the selected workpiece 22 into the respective machining stations 26A–26G.

After removing and inspecting a selected workpiece 22, the operator may return the selected workpiece 22 to the entry end of the transfer path 27 so that it can be processed by the machining units downstream from the designated machining unit. After returning the inspected, partially machined workpiece 22 to the entry end of the transfer path 27, the operator puts a first one of the machining units 24A in a "bypass" mode until the inspected workpiece 22 passes by the first machining station. The operator then disables the bypass mode to allow the first machining unit to resume machining operations on subsequent workpieces 22 entering the transfer path 27. The operator then walks along the transfer path 27 with the inspected workpiece 22 putting each successive machining unit in bypass mode before the inspected workpiece 22 passes, then disables the bypass mode for each machining unit after the inspected workpiece 22 passes. The operator continues in this manner until reaching the intermediate position where machining operations on the inspected workpiece 22 were originally halted. In other words, the machining units that have already machined the selected workpiece 22 are prevented from re-machining the selected workpiece 22 as the selected workpiece 22 passes those machining units while moving along the transfer path 27 from the entry end. The remaining succeeding machining units that were previously prevented from further machining the selected workpiece 22, are then allowed to perform their respective machining operations on the inspected workpiece 22 as it again moves along the transfer path 27 to the exit end. The workpiece 22 is then removed from the transfer path 27 and is inspected in the desired intermediate machined state.

This description is intended to illustrate certain embodiments of the invention rather then to limit the invention. Therefore, it uses descriptive rather than limiting words. Obviously, it's possible to modify this invention from what the description teaches. Within the scope of the claims, one may practice the invention other then as described.

What is claimed is:

1. A transfer line apparatus for permitting multiple operations on each of a series of workpieces, the apparatus comprising:

a plurality of machining units disposed at respective successive machining stations along a transfer path;

a workpiece transporter configured to move workpieces along the transfer path so as to position each of the workpieces at each of the machining stations to allow each of the machining units to machine each of the workpieces as the workpieces move along the transfer path; and at least one designated machining unit configured to respond to an inspection command by allowing a designated workpiece to pass by the designated machining unit along the transfer path without being machined by the designated machining unit so that the designated workpiece may be subsequently inspected in a form unaltered by the designated machining unit after the designated workpiece is moved by the workpiece transporter past the last of the successive machining stations.

2. A transfer line apparatus as defined in claim 1 in which a succeeding machining unit following the designated machining unit along the transfer path is configured to respond to an inspection command by allowing the designated workpiece to pass by without machining the workpiece.

3. A transfer line apparatus as defined in claim 1 in which all machining units following the designated machining unit along the transfer path are configured to respond to an inspection command by allowing the designated workpiece to pass by without machining the designated workpiece.

4. A transfer line apparatus as defined in claim 3 in which the apparatus includes a controller connected to the machining units and configured to respond to an inspection command by causing the designated machining unit and the machining units following the designated machining unit to allow the designated workpiece to pass by without being machined.

5. A transfer line apparatus as defined in claim 1 in which the machining units are each configured to respond to respective corresponding inspection commands by allowing the designated workpiece to pass by without being machined.

6. A transfer line apparatus as defined in claim 1 including a tracker configured to monitor the position of the designated workpiece to be inspected as the designated workpiece moves along the transfer path.

7. A transfer line apparatus as defined in claim 6 in which the tracker includes a marking device configured to track a designated workpiece to be inspected.

8. A method for inspecting workpieces in a transfer line, the method including the steps of:

providing a plurality of different kinds of machining units at respective machining stations disposed along a transfer path;

moving workpieces along the transfer path to be machined at each of the machining stations by the corresponding machining units;

selecting a workpiece to be inspected and a desired machined state that the selected workpiece is to be in for inspection;

determining at what point along the transfer path the selected workpiece will be in the desired machined state;

preventing at least one of the succeeding machining units from machining the selected workpiece as the selected workpiece moves along the transfer path to an exit end of the transfer path; and inspecting the selected workpiece in the desired machined state after the selected workpiece has been moved by all of the machining units.

9. A method for inspecting workpieces in a transfer line, the method including the steps of:

providing a plurality of different kinds of machining units at respective machining stations disposed along a transfer path;

moving workpieces along the transfer path to be machined at each of the machining stations by the corresponding machining units;

selecting a workpiece to be inspected and a desired machined state that the selected workpiece is to be in for inspection;

determining at what point along the transfer path the selected workpiece will be in the desired machined state;

preventing any remaining one of the succeeding machining units from machining the selected workpiece as the selected workpiece moves along the transfer path to an exit end of the transfer path;

inspecting the selected workpiece in the desired machined state;

returning the selected workpiece to an entry end of the transfer path;

moving the selected workpiece along the transfer path past the machining units, and causing the remaining succeeding machining units to machine the inspected workpiece as it again moves along the transfer path to the exit end.

10. The method of claim 8 in which the step of moving workpieces along the transfer path to be machined at each of the machining stations by the corresponding machining units includes providing a workpiece transporter configured to move the workpieces along the transfer path.

11. The method of claim 8 in which the step of moving workpieces along the transfer path to be machined at each of the machining stations by the corresponding machining units includes positioning each of the workpieces at each of the machining stations to allow each of the machining units to machine each of the workpieces as they move along the transfer path.

12. The method of claim 9 in which the step of returning the selected workpiece to an entry end of the transfer path includes preventing the machining units that have already machined the selected workpiece from re-machining the selected workpiece as the selected workpiece passes those machining units while moving along the transfer path.

* * * * *